(12) United States Patent
Homma

(10) Patent No.: US 11,982,361 B2
(45) Date of Patent: May 14, 2024

(54) DIAPHRAGM VALVE AND METHOD FOR EXCHANGING VALVE SEAT THEREOF

(71) Applicant: KITZ SCT CORPORATION, Tokyo (JP)

(72) Inventor: Katsuhiko Homma, Ohta (JP)

(73) Assignee: KITZ SCT CORPORATION, Tokyo (JP)

( * ) Notice: Subject to any disclaimer, the term of this patent is extended or adjusted under 35 U.S.C. 154(b) by 70 days.

(21) Appl. No.: 17/796,135

(22) PCT Filed: Feb. 8, 2021

(86) PCT No.: PCT/JP2021/004539
§ 371 (c)(1),
(2) Date: Jul. 28, 2022

(87) PCT Pub. No.: WO2021/166712
PCT Pub. Date: Aug. 26, 2021

(65) Prior Publication Data
US 2023/0122372 A1 Apr. 20, 2023

(30) Foreign Application Priority Data

Feb. 21, 2020 (JP) ................................. 2020-027835

(51) Int. Cl.
*F16K 1/46* (2006.01)
*F16K 1/42* (2006.01)
(Continued)

(52) U.S. Cl.
CPC ................ *F16K 1/465* (2013.01); *F16K 1/42* (2013.01); *F16K 1/46* (2013.01); *F16K 7/14* (2013.01); *F16K 7/16* (2013.01); *F16K 7/17* (2013.01)

(58) Field of Classification Search
CPC . F16K 1/465; F16K 1/42; F16K 1/425; F16K 1/427; F16K 7/14; F16K 7/16; F16K 7/17
See application file for complete search history.

(56) References Cited

U.S. PATENT DOCUMENTS 4,520,842 A * 6/1985 Elliott .................. F16K 15/025
137/329.04
5,108,069 A * 4/1992 Tada ..................... F16K 31/163
251/297
(Continued)

FOREIGN PATENT DOCUMENTS

CN 360258 2/1962
JP 4-48470 4/1992
(Continued)

OTHER PUBLICATIONS

International Search Report dated Apr. 20, 2021 in International Application No. PCT/JP2021/004539.

*Primary Examiner* — Atif H Chaudry
(74) *Attorney, Agent, or Firm* — Wenderoth, Lind & Ponack, L.L.P.

(57) ABSTRACT

A diaphragm valve includes an outer wall section for valve seat mounting provided in a primary-side opening section, a stepped section provided on the inner periphery of the outer wall section, a seat ring press-fitted into and fixed to the stepped section, a flange section provided in the seat ring, and a press-fitting groove for valve seat mounting configured with a space between the seat ring and the outer wall section and the flange section, in which a valve seat press-fitted into and fixed to the press-fitting groove has an upper portion slightly protruding in a state where an extension section covers a position in the vicinity of a top portion of the outer wall section and an extension section the inner (Continued)

periphery of which is decreased in the upper portion of the valve seat covers a position in the vicinity of a top portion of the seat ring.

5 Claims, 4 Drawing Sheets

(51) Int. Cl.
*F16K 7/14* (2006.01)
*F16K 7/16* (2006.01)
*F16K 7/17* (2006.01)

(56) References Cited

U.S. PATENT DOCUMENTS

| | | |
|---|---|---|
| 7,686,280 B2 | 3/2010 | Lowery |
| 2005/0211944 A1 | 9/2005 | Tutt et al. |
| 2007/0145321 A1* | 6/2007 | Lowery .................... F16K 7/16 |
| | | 251/331 |
| 2015/0323082 A1 | 11/2015 | Glime, III et al. |

FOREIGN PATENT DOCUMENTS

| | | |
|---|---|---|
| JP | 5280208 | 9/2013 |
| JP | 2017-516039 | 6/2017 |

* cited by examiner

US 11,982,361 B2

DIAPHRAGM VALVE AND METHOD FOR EXCHANGING VALVE SEAT THEREOF

TECHNICAL FIELD

The present invention relates to a diaphragm valve and a method for replacing a valve seat thereof, and particularly to a diaphragm valve capable of maintaining significantly high durability and stability of a Cv value, as used for an ALD (atomic layer deposition) process, for example.

BACKGROUND ART

In recent years, in a semiconductor manufacturing gas supply apparatus, a process for opening and closing a valve in a short time as represented by an ALD, for example, has been increasingly introduced. In an ALD process or the like, a plurality of types of gases such as a precursor, inert gas, and oxidizing species gas are alternately supplied to a chamber at a stable flow rate by high-speed switching of a significantly short cycle from a gas supply system under a high-temperature atmosphere of approximately 250° C., and atom layers are homogeneously and uniformly stacked one by one at a nano level on a wafer in the chamber to form a thin film.

In the case, a diaphragm valve requires functional properties such as heat resistance high enough to withstand a high temperature of approximately 250° C., stability of a flow rate at which gas is accurately supplied in a short time, high-speed operability for switching supply of gas in a short time while accompanying a high cutoff performance to avoid mixture of gases, and durability high enough to withstand a large number of times of a valve opening and closing cycle in addition to ensuring a sealing property at the time of valve closing.

In the ALD process, the number of times of an opening and closing operation of the diaphragm valve is significantly increased to open and close the diaphragm valve at high speed in a short time, an influence of a pressing force to be applied to a valve seat made of resin from a metal diaphragm at the time of valve closing is increased, and further the valve seat is easily crushed and deformed because a temperature of raw material gas to be supplied is also in a state of a high temperature of approximately 250° C. When the valve seat is crushed and deformed, it is impossible not only to maintain a sealing properly but also to stabilize a Cv value because the Cv value varies.

In cases such as a case where the sealing property cannot be maintained because the valve seat is crushed and deformed, for example, the valve seat that has been damaged needs to be quickly taken out of a body and exchanged with a new valve seat. Accordingly, the diaphragm valve used in the ALD process requires that the valve seat is not easily crushed and deformed and the valve seat is easily exchanged when crushed and deformed.

As the diaphragm valve making it easy to exchange the valve seat, Patent Literature 1 proposes a diaphragm valve that press-fits a valve seat into a valve seat recess provided in a body using a valve seat installation tool when attaching the valve seat, and engraves a female screw on an inner peripheral surface of the valve seat using a valve seat extraction tool having a male screw section at its distal end and pulls out the valve seat screwed into the male screw section upward when taking out the valve seat.

Patent Literature 2 proposes a diaphragm valve that press-fits a valve seat having a sleeve made of a metal inserted into its inner periphery side into a valve seat material attachment hole of a body using a tool when attaching the valve seat, and makes a general manually operated tool such as a manually operated tap engage with an inner peripheral surface of the valve seat and extracts both the sleeve and the valve seat from the body when taking out the valve seat.

CITATION LIST

Patent Literatures

PTL 1: Japanese Translation of PCT International Application Publication No. 2017-516039
PTL 2: Japanese Patent No. 5280208

SUMMARY OF INVENTION

Technical Problem

However, in the diaphragm valve in Patent Literature 1, there is no support member on the inner periphery side of the valve seat. Therefore, particularly if a valve seat made of a soft material such as PFA is used at a high temperature of approximately 250° C., the valve seat is easily deformed toward the inner peripheral surface side at the time of valve closing, and a top portion of the valve seat becomes lower by the deformation, whereby the durability of the diaphragm deteriorates.

When the valve seat is taken out, the female screw is engraved on the inner peripheral surface of the valve seat using the valve seat extraction tool. Accordingly, fine chips occur in the case, whereby a flow path in the body may be contaminated.

In the diaphragm valve in Patent Literature 2, its upper end is made to protrude from a surface of a valve cavity and an end portion of the sleeve to form the valve seat. Accordingly, there is a problem with the durability of the valve seat.

Further, the inner diameter of the sleeve is smaller than the inner diameter of a primary-side opening section in the body, to narrow a flow path, causing a decrease in flow rate of the valve.

The present invention has been developed to solve the above-described problem, and is directed to providing a diaphragm valve that can prevent a valve seat from being crushed and deformed even if subjected to a high-speed opening and closing operation in a high-temperature state and can stably ensure a large flow rate to stably maintain a high Cv value without any variation and, in addition, makes it easy to exchange the valve seat and a method for replacing the valve seat for the valve.

Solution to Problem

To attain the above-described object, a first aspect of the invention provides a diaphragm valve including a diaphragm that is opened and closed by contacting and separating from a valve seat provided in a body, the diaphragm valve including a primary-side opening section provided in the body having a flow inlet and a flow outlet, an outer wall section for valve seat mounting provided in the primary-side opening section, a stepped section provided in the inner periphery of the outer wall section, a seat ring press-fitted into and fixed to the stepped section, a flange section provided in the seat ring, and a press-fitting groove for valve seat mounting configured with a space between the seat ring and the outer wall section and the flange section as a bottom portion, in which the valve seat press-fitted into and fixed to the press-fitting groove has its upper portion slightly protruding in a state where an extension section the outer periphery of which is increased in the upper portion of the valve seat covers a position in the vicinity of a top portion of the outer wall section and an extension section the inner periphery of which is decreased in the upper portion of the valve seat covers a position in the vicinity of a top portion of the seat ring.

A second aspect of the invention provides the diaphragm valve in which an inner peripheral surface of the seat ring is provided with a female screw section.

A third aspect of the invention provides the diaphragm valve in which the top portion of the seat ring has a height smaller than a height of the outer wall section, and an inner diameter of the seat ring is made larger than an inner diameter of the primary-side opening section.

A fourth aspect of the invention provides the diaphragm valve in which the stepped section is further provided with a press-fitting stepped section, and the seat ring is press-fitted into the press-fitting stepped section to press-fit and fix the seat ring into and to the body.

A fifth aspect of the invention provides the diaphragm valve in which the valve seat has a large diameter section having an increased outer diameter such that it does not come out after being press-fitted and fixed provided on the outer periphery of its bottom portion is made to engage with an engagement section provided in the outer wall section so that the valve seat that has been press-fitted and fixed does not come out.

A sixth aspect of the invention provides a method for replacing a valve seat for the diaphragm valve, the method including press-fitting and fixing a bottom portion of the valve seat into and to the press-fitting groove with the bottom portion contacting an upper surface of the flange section when mounting the valve seat, and then screwing a jig provided with a male screw section into a female screw section provided on an inner peripheral surface of the seat ring to pull up the jig when removing the valve seat, to extract the valve seat while locking the bottom portion of the valve seat by the flange section in the seat ring.

Advantageous Effects of Invention

The first aspect of the invention makes it possible to obtain the diaphragm valve that can prevent the valve seat from being crushed and deformed in a high-temperature state and therefore can maintain a high flow rate (high Cv value) in a stable state without any variation with high durability.

The second aspect of the invention makes it possible to easily exchange the valve seat without damaging the valve seat.

The third aspect of the invention makes it possible to ensure a large flow rate because a flow path area of the primary-side opening section is not reduced even if the seat ring is provided and a flow from the primary-side opening section to the valve chamber is not obstructed.

The fourth aspect of the invention makes it possible to firmly press-fit and fix the seat ring into and to the body and securely fix the valve seat in a press-fitted state between the outer wall section and the seat ring.

The fifth aspect of the invention makes it possible to obtain high durability because the valve seat that has been press-fitted and fixed does not come out.

The sixth aspect of the invention makes it possible to easily exchange the valve seat.

DESCRIPTION OF EMBODIMENTS

Figure 1:
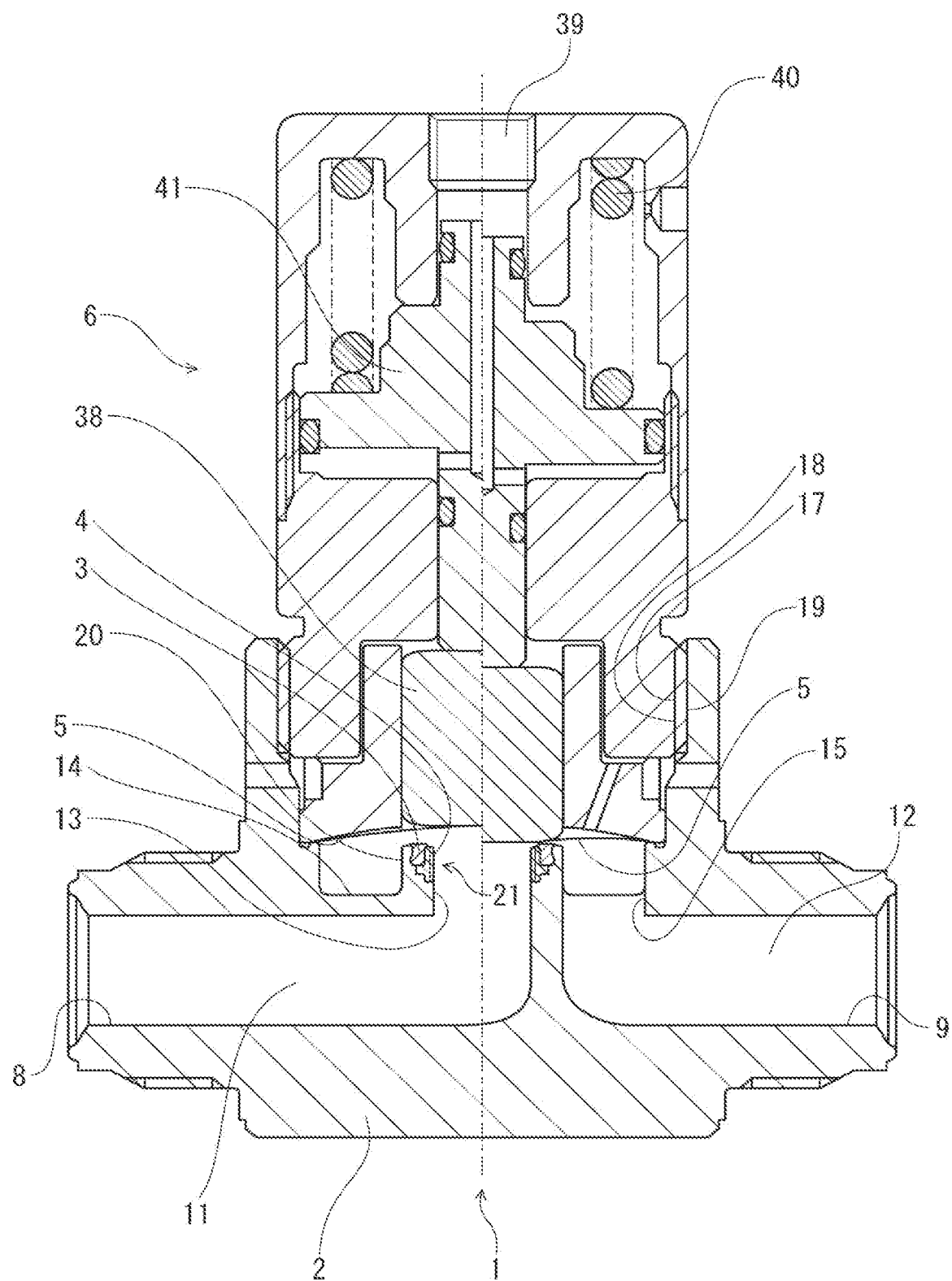
FIG. 1 is a vertical sectional view illustrating an embodiment of a diaphragm valve according to the present invention.
Figure 2:
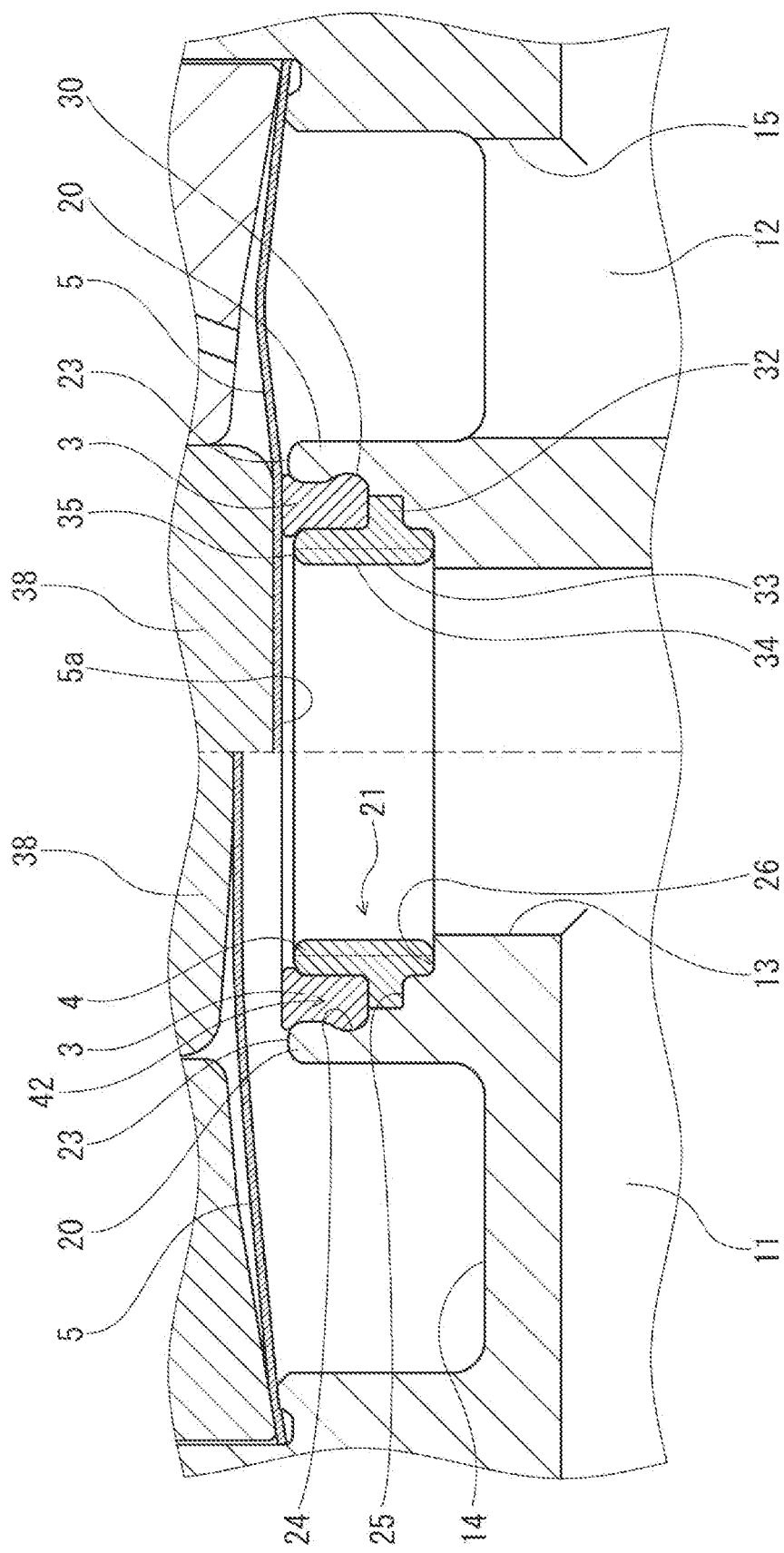
FIG. 2 is a cross-sectional view illustrating a principal part of the diaphragm valve illustrated in FIG. 1.
Figure 3:
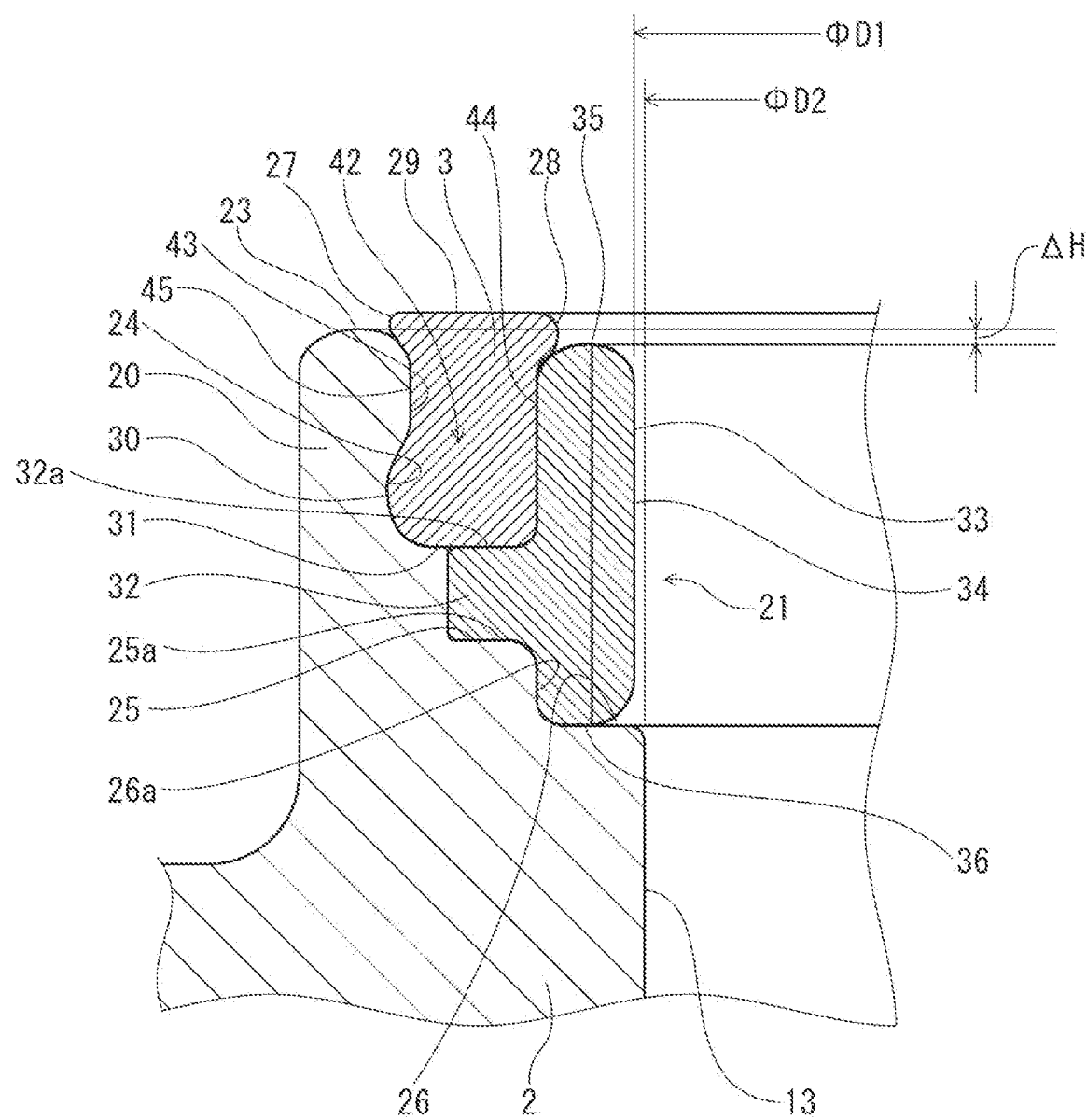
FIG. 3 is a partially enlarged sectional view of FIG. 2.

An example of an embodiment of a diaphragm valve in the present invention will be specifically described below based on the drawings. FIG. 1 is a vertical sectional view illustrating an embodiment of the diaphragm valve according to the present invention, FIG. 2 is a cross-sectional view illustrating a principal part of the diaphragm valve, and FIG. 3 is a partially enlarged sectional view illustrating the principal part.

In FIG. 1, a diaphragm valve 1 includes a body 2, a valve seat 3, a seat ring 4, a diaphragm 5, and an actuator 6.

The body 2 is integrally formed of a stainless material such as SUS316L, for example, is provided with a flow inlet 8 and a flow outlet 9, and has a primary flow path 11 consecutive from the flow inlet 8 and a secondary flow path 12 consecutive from the flow outlet 9 formed therein. The primary flow path communicates with a valve chamber 14 via a primary-side opening section 13 and the secondary flow path 12 communicates with the valve chamber 14 via a secondary-side opening section 15.

An upper portion of the body 2 is provided with an opening section 17, and a female screw section 18 is formed on the inner periphery side of the opening section 17. A male screw section 19 formed in a lower end portion of the actuator 6 is screwed into the female screw section 18 so that the actuator 6 can be mounted on the upper portion of the body 2.

The primary-side opening section 13 is provided with an outer wall section 20 for valve seat mounting, and a stepped section 21 into and to which the seat ring 4 is to be press-fitted and fixed is provided on the inner periphery of the outer wall section 20.

A top portion 23 of the outer wall section 20 is formed in a round shape in cross section, and a recess 24 having a round shape in cross section into which a large diameter section 30 of the valve seat 3 is to be inserted is formed in a lower portion on the inner periphery side of the outer wall section 20.

A flange section mounting stepped section 25 on which a flange section 32 in the seat ring 4 is to be mounted and a press-fitting stepped section 26 into which the seat ring 4 is to be press-fitted are formed in the stepped section 21, and a bottom surface 25$a$ of the flange section mounting stepped section 25 and a wall surface 26$a$ of the press-fitting stepped section 26 are connected to each other by a smooth curved surface.

The valve seat 3 is provided in a substantially cylindrical shape by a resin material such as fluorine resin, and has, as its cross-sectional shape, an extension section 27 having a round shape in cross section the outer periphery of which is increased and an extension section 28 having a round shape in cross section the inner periphery of which is decreased provided in its upper portion, has a top portion 29 as a substantially flat surface provided therein to be connected to each of the extension section 27 and the extension section 28 by a smooth curved surface, and has the large-diameter section 30 having a round shape in cross section having an increased outer diameter provided on the outer periphery of its bottom portion, as illustrated in FIG. 3.

As illustrated in FIG. 2, when press-fined into and fixed to a press-fitting groove 42 for valve seat mounting, the valve seat 3 is formed such that the height of the valve seat 3 protruding to above the top portion 23 of the outer wall section 20 and to above a top portion 35 of the seat ring 4 is as small as possible in a range in which a lower surface 5a of the diaphragm 5 does not contact the top portion 23 of the outer wall section 20 and the top portion 35 of the seat ring 4 at the time of an operation for closing the diaphragm 5.

Although the valve seat 3 is formed of PFA (perfluoroalkoxyethylene copolymer resin) in this example, a material for the valve seat 3 is not limited to PFA, but can be appropriately changed. A flat shape communicating with the extension sections 27 and 28 from the top portion 29 of the valve seat 3 can also be formed by machine processing and injection processing at the time of forming the valve seat 3, and can also be formed by intentionally crushing valve seats respectively having top portions that differ in shape using a jig or the like from above after mounting the valve seats in the body 2.

The seat ring 4 is provided in a substantially cylindrical shape by stainless steel such as SUS316L, and has the flange section 32 that supports a bottom portion 31 of the valve seat 3 and a female screw section 34 respectively provided on its outer peripheral surface and its inner peripheral surface 33. The top portion 35 and a lower end portion 36 are each formed in a round shape in cross section.

As illustrated in FIG. 3, the seat ring 4 is formed such that the top portion 35 of the seat ring 4 is lower by ΔH than the top portion 23 of the outer wall section 20 when the seat ring 4 is press-fitted into and fixed to the press-fitting stepped section 26. Further, when an inner diameter φD1 of the seat ring 4 is made larger than an inner diameter φD2 of the primary-side opening section 13, and the outer diameter of a lower portion of the seat ring 4 is made larger than the inner diameter of the wall surface 26a of the press-fitting stepped section 26 and a diameter in which the seat ring 4 can be press-fitted into the press-fitting stepped section 26.

Although the seat ring 4 is produced by stainless steel (SUS316L) in this example, a material for the seat ring 4 is not limited to stainless steel, but can also be produced by a plastic material if a material enabling the female screw section 34 to be formed on the inner peripheral surface 33 and having a hardness appropriately kept at a use temperature of the valve.

The diaphragm 5 is configured by making a predetermined number of members each having a thin plate shape made of a metal overlap one another, is formed in a substantially disk shape in appearance exhibiting a gentle convexly curved shape with its central portion as a vertex toward one side (upward) in a natural state, and has an elastic force that can be self-restored to a form in the natural state.

As illustrated in FIG. 2, the diaphragm 5 is deformed, when a diaphragm piece 38 of the actuator 6 falls, around the vicinity of the center of the diaphragm 5 because the vicinity of the center is pressed, and are seated on the valve seat 3, to enter a valve closed state.

When there is no pressing force of the diaphragm piece 38, the diaphragm 5 is deformed in a direction in which it is restored to the convexly curved shape while pushing up the diaphragm piece 38 with the elastic force, and the diaphragm 5 separates from the valve seat 3, to enter a valve opened state.

The actuator 6 is an air-driven actuator. When the actuator 6 is supplied with air from an air supply port 39 provided in its upper portion, a piston 41 rises against a pressing force of a spring 40. Accordingly, the pressing force of the diaphragm piece 38 is lost, whereby the valve enters a valve opened state. When the supply of the air is stopped, the piston 41 falls with an elastic force of the spring 40. Accordingly, the pressing force of the diaphragm piece 38 is generated, whereby the valve enters a valve closed state.

Then, a function in the above-described embodiment of the diaphragm valve according to the present invention will be described.

As illustrated in FIG. 3, when the seat ring 4 is press-fitted into the press-fitting stepped section 26 provided in the body 2, the lower portion of the seat ring 4 can be securely and firmly fixed to the press-fitting stepped section 26 because the outer diameter of the lower portion of the seat ring 4 is set to the diameter in which the seat ring 4 can be press-fitted into and fixed to the press-fitted stepped section 26, the flange section 32 is housed in the flange section mounting stepped section 25, and a press-fitting groove 42 for valve seat mourning is formed with an upper surface 32a of the flange section 32 as its bottom portion between the seat ring 4 and the outer wall section 20.

At this time, the lower end portion 36 of the seat ring 4 is formed in a round shape in cross section, and the bottom surface 25a of the flange section mounting stepped section 25 and the wall surface 26a of the press-fitting stepped section 26 are connected to each other by a curved surface, to form the stepped section 21. Accordingly, the seat ring 4 is easily press-fitted into the press-fitting stepped section 26. The seat ring 4 is fixed to the press-fitting stepped section 26 by an interference fit. Accordingly, when the seat ring 4 is removed from the press-fitting stepped section 26, the seat ring 4 may be pulled out upward.

When the valve seat 3 is press-fitted into the press-fitting groove 42 thus formed, the valve seat 3 can be fixed to the body 2. However, the large-diameter section 30 having a round shape in cross section having an increased outer diameter is provided on the outer periphery of the bottom portion of the valve seat 3, and the top portion 23 of the outer wall section 20 is formed in a round shape in cross section. Accordingly, the valve seat 3 can be easily press-fitted into the press-fitting groove 42. Further, after the valve seat 3 is press-fitted into the press-fitting groove 42, the large diameter section 30 engages with the recess 24 having a round shape in cross section formed in the lower portion on the inner periphery side of the outer wall section 20, to prevent the valve seat 3 from coming off the press-fitting groove 42.

When mounted in the press-fitting groove 42, the valve seat 3 is fixed in a press-fitted state by an inner peripheral surface 43 of the outer wall section 20 and an outer peripheral surface 44 of the seat ring 4. Accordingly, a space between the inner peripheral surface 43 of the outer wall section 20 and the outer peripheral surface 45 of the valve seat 3 is securely sealed. Therefore, no back leakage occurs in the valve seat 3.

The valve seat 3 is fixed in a press-fitted state by the inner peripheral surface 43 of the outer wall section 20 and the outer peripheral surface 44 of the seat ring 4. Accordingly, the diaphragm valve 1 enters a valve closed state. If the top portion 29 of the valve seat 3 is pressed by the diaphragm 5, a portion of the valve seat 3 supported from the inner and outer peripheries thereof by the inner peripheral surface 43 of the outer wall section 20 of the body 2 and the outer peripheral surface 44 of the seat ring 4 is not inclined.

Further, the top portion 29 of the valve seat 3 is formed into a substantially flat surface, and has the extension section 27 having a round shape in cross section the outer periphery of which is increased and the extension section 28 having a round shape in cross section the inner periphery of which is decreased provided in its upper portion, and the top portion 29 and each of the extension section 27 and the extension section 28 are connected to each other by a smooth curved surface. Accordingly, when the press-fitting of the valve seat 3 into the press-fitting groove 42 is completed, the valve seat 3 enters a state where the extension section 27 adhesively covers a position in the vicinity of the top portion 23 of the outer wall section 20 and a state where the extension section 28 adhesively covers a position in the vicinity of the top portion 35 of the seal ring 4, and the top portion 29 of the valve seat 3 is supported by the top portion 23 of the outer wall section 20 from the outer periphery side and the top portion 35 of the seat ring 4 from the inner periphery side, as illustrated in FIG. 3.

As a result, the pressure reception area of the top portion 29 of the valve seat 3 is increased, and a surface pressure is decreased when the top portion 29 of the valve seat 3 is pressed by the lower surface 5a of the diaphragm 5 at the time of a closing operation of the diaphragm valve 1. Accordingly, the valve seat 3 can be prevented from being crushed.

When mounted on the press-fitting groove 42 for valve seat mounting, the valve seat 3 protrudes to above the top portion 23 of the outer wall section 20 and to above the top portion 35 of the seat ring 4 because the height of the valve seat 3 in a portion protruding to above the top portion 23 of the outer wall section 20 and to above the top portion 35 of the seat ring 4 is set as small as possible in a range in which the lower surface 5a of the diaphragm 5 does not contact the top portion 23 of the outer wall section 20 and the top portion 35 of the seat ring 4 when the diaphragm valve 1 is in a valve closed state, as illustrated in FIGS. 2 and 3. Therefore, the height of a portion of the valve seat 3 that is not supported from the inner and outer peripheries thereof by the inner peripheral surface 43 of the outer wall section 20 and the outer peripheral surface 44 of the seat ring 4 can be minimized.

As a result, a portion of the valve seat that is deformed upon being pressed by the lower surface 5a of the diaphragm 5 can be minimized at the time when the diaphragm valve 1 is in a valve closed state. Therefore, the valve seat 3 can be prevented from being deformed.

In addition, the top portion 29 of the valve seat 3 that has received a shock by the lower surface 5a of the diaphragm 5 is supported from the inner and outer peripheries thereof by the top portion 23 of the outer wall section 20 via the extension section 27 and the top portion 35 of the seat ring 4 via the extension section 28. Therefore, the vale seat 3 can be further prevented from being deformed upon being pressed by the diaphragm 5.

As described above, in the diaphragm valve according to the present invention, when the surface pressure of the valve seat 3 to be pressed by the lower surface 5a of the diaphragm 5 is decreased at the time of the valve closed state, to prevent the valve seat 3 from being crushed and to greatly prevent the valve seat 3 from being deformed, the durability of the valve seat 3 can be improved. As the durability of the valve seat 3 is improved, a change with time of a flow rate can be stabilized.

Further, as illustrated in FIG. 3, the seat ring 4 press-fitted into the press-fitting stepped section 26 constitutes the press-fitting groove 42 for valve seat mounting with the flange section 32 as a bottom portion between itself and the outer wall section 20, and the flange section 32 supports the bottom portion 31 of the valve seat 3. Since the inner diameter φD1 of the seat ring 4 is larger than the inner diameter φD2 of the primary-side opening section 13, the flow path area of the primary-side opening section 13 is not reduced even if the seat ring 4 is arranged in the primary-side opening section 13.

The top portion 35 of the seat ring 4 is formed in a round shape in cross section, and the height of the seat ring 4 is set such that the top portion 35 of the seat ring 4 is lower by ΔH than the top portion 23 of the outer wall section 20 with the seat ring 4 press-fitted into and fixed to the press-fitting stepped section 26, not to prevent a flow from the primary-side opening section 13 toward the valve chamber 14.

As described above, even if the seat ring 4 is arranged in the primary-side opening section 13, the flow path area of the primary-side opening section 13 is not reduced, and the flow from the primary-side opening section 13 toward the valve chamber 14 is not obstructed. Therefore, a large flow rate can be ensured to increase a Cv value of the valve.

In addition thereto, the female screw section 34 is formed on the inner peripheral surface 33 of the seat ring 4. Accordingly, a male screw section provided in a jig for detachably attaching a seat ring is screwed into the female screw section 34 so that the seat ring 4 can be easily detachably attached to the body 2. The valve seat 3 is press-fitted into and fixed to the press-fitting groove 42 with the bottom portion 31 supported by the flange section 32. Thus, when the valve seat 3 is taken out, if the seat ring 4 is pulled out, the valve seat 3 can be taken out simultaneously with the seat ring 4 because the valve seat 3 is locked in the flange section 32. Therefore, the valve seat 3 can be easily taken out, and the valve seat 3 can be exchanged without being damaged.

Figure 4:
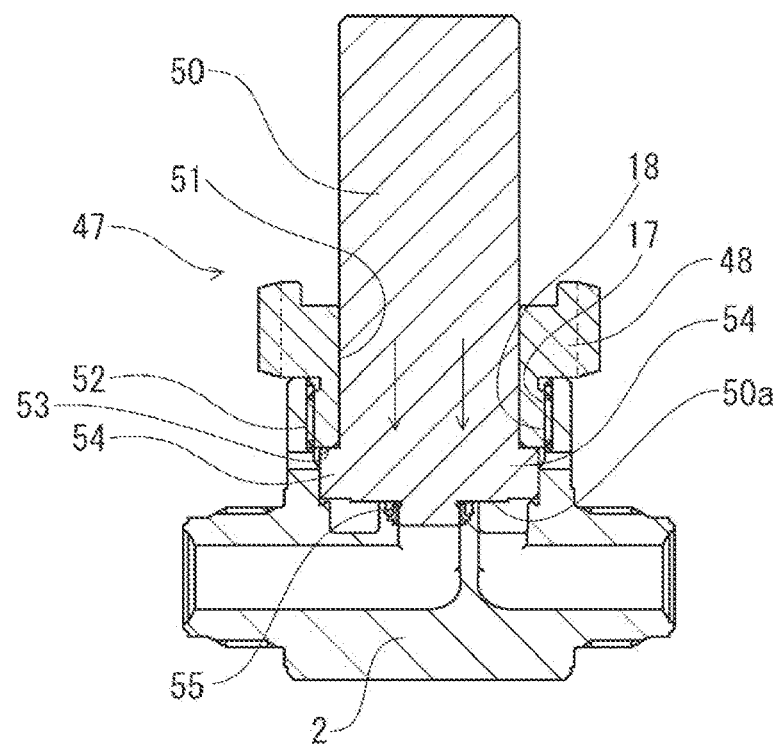
FIG. 4 is a diagram for describing an example of a method for replacing a valve seat for the valve according to the present invention, where FIG. 4($a$) is a diagram for describing a method for attaching the valve seat, and FIG. 4($b$) is a diagram for describing a method for taking out the valve seat.
Figure 4:
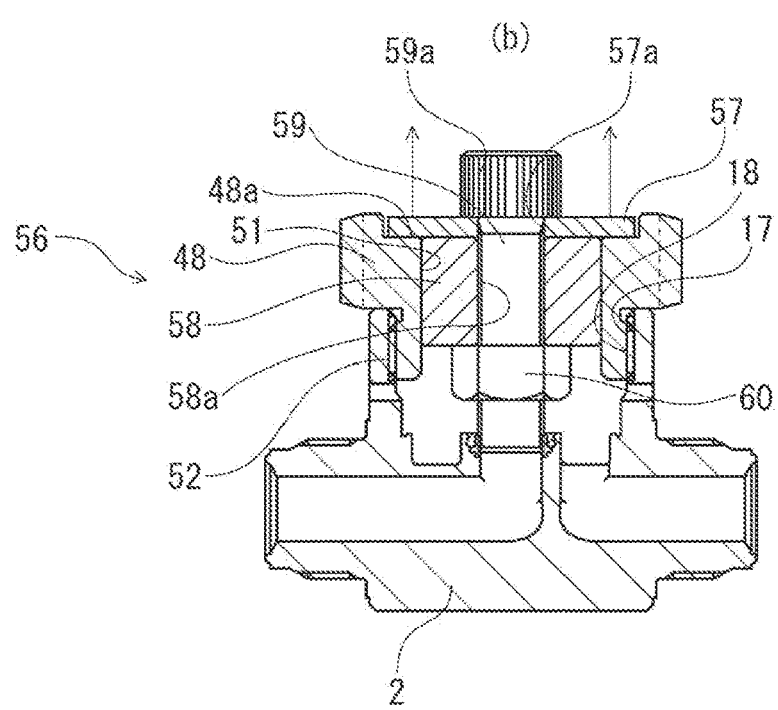

Then, a method for replacing the vale seat according to the present invention will be described. FIG. 4 is a diagram for describing a method for replacing a valve seat for the diaphragm valve according to the present invention using an example of a jig for detachably attaching a seat ring. The jig for detachably attaching the seat ring differs in configuration between the time when the valve seat 3 is mounted and the time when the valve seat 3 is removed. Therefore, the time when the valve seat 3 is mounted will be first described.

A jig 47 that mounts the valve seat 3 includes an adapter 48 and a press-fitting member 50. The adapter 48 is a component for pressing the press-fitting member 50 into the body 2, and has an insertion hole 51 into which the press-fitting member 50 is to be inserted, a male screw section 52 to be screwed into the female screw section 18 of the body 2, and a pressing surface 53 that presses the press-fitting member 50 respectively provided at its center, on the outer periphery of its lower portion, and in its lower end portion. The press-fitting member 50 is a component for press-fitting the seat ring 4 into the press-fitting stepped section 26 in the body 2, and has a flange section 54 that receives a pressing force to be exerted from the pressing surface 53 of the adapter 48 and a male screw section 55 that screws the seat ring 4 respectively provided in its lower end portion and at a distal end of its lower portion.

When the jig 47 mounts the valve seat 3 in the body 2, the valve seat 3 is first attached to the seat ring 4 with the bottom portion 31 of the valve seat 3 contacting the upper surface 32a of the flange section 32, the seat ring 4 is screwed into the male screw section 55 at the distal end of the lower portion of the press-fitting member 50 until the top portion 29 of the valve seat 3 contacts the lower surface 50a of the press-fitting member 50, and the press-fitting member 50 into which the seat ring 4 is screwed is inserted into the insertion hole 51 from the lower surface side of the adapter 48.

Then, the male screw section 52 of the adapter 48 is slightly screwed into the female screw section 18 provided on the inner periphery of the opening section 17 of the body 2, and the adapter 48 with the press-fitting member 50 inserted thereinto is attached on an upper portion of the body 2. In this state, the center of the opening section 17 of the body 2 and the center of the seat ring 4 match each other. Therefore, the press-fitting member 50 is slightly pressed until the bottom portion 31 of the valve seat 3 contacts the top portion 23 of the outer wall section 20. Then, the adapter 48 is slightly screwed until the pressing surface 53 of the adapter 48 abuts on the flange section 54 of the press-fitting member 50.

When the adapter 48 is strongly screwed after it is confirmed that the pressing surface 53 of the adapter 48 has abutted on the flange section 54 of the press-fitting member 50, the flange section 54 of the press-fitting member 50 is pressed by the pressing surface 53 of the adapter 48, whereby the press-fitting member 50 moves downward. As a result, the lower portion of the seat ring 4 screwed into the male screw section 55 provided at the distal end of the lower portion of the press-fitting member 50 is press-fitted into the press-fitting stepped section 26, and the valve seat 3 of which top portion 29 is pressed by the lower surface 50a of the press-fitting member 50 is press-fitted into the press-fitting groove 42.

When press-fitting and fixing of the seat ring 4 into and to the press-fitting stepped section 26 and press-fitting of the valve seat 3 into the press-fitting groove 42 are completed, the valve seat 3 is held in an adhesive state between the inner peripheral surface 43 of the outer wall section 20 and the outer peripheral surface 44 of the seat ring 4, whereby the mounting of the valve seat 3 on the body 2 is completed.

Then, the time when the valve seat 3 is removed will be described. A jig 56 for seat ring removal includes the adapter 48, a pressure receiving metal fitting 57, a spacer 58, an engagement bolt 59, and a nut 60.

The adapter 48 is a component also used for the jig 47. However, if the adapter 48 is used for taking out the valve seat 3, the adapter 48 is used with the pressure receiving metal fitting 57 mounted in the mounting stepped section 48a provided on its upper surface. The pressure receiving metal fitting 57 is a component for transmitting a pressing force from the adapter 48 to a head portion 59a of the engagement bolt 59, and has a bolt insertion hole 57a into which the engagement bolt 59 is to be inserted provided at its center. The spacer 58 is a component for holding the center of the engagement bolt 59 to match the center of the adapter 48, and has a bolt insertion hole 58a provided at its center. The engagement bolt 59 is a component to be screwed into the female screw section 34 provided on the inner peripheral surface 33 of the seat ring 4 to pull the seat ring 4 out of the press-fitting stepped section 26. The nut 60 is a component for holding the spacer 58 in the insertion hole 51 of the adapter 48.

When the jig 56 removes the valve seat 3 from inside the body 2, the engagement bolt 59 is first inserted into the bolt insertion hole 57a of the pressure receiving metal fitting 57 and the bolt insertion hole 58a of the spacer 58, the nut 60 is then screwed into the engagement bolt 59, and the nut 60 is screwed until a spacing between a lower surface of the spacer 58 and an upper surface of the nut 60 reaches a thickness substantially equal to the thickness of the seat ring 4, to integrate the pressure receiving metal fitting 57, the spacer 58, the engagement bolt 59, and the nut 60.

Then, the pressure receiving metal fitting 57, the spacer 58, the engagement bolt 59, and the nut 60 that have been integrated are inserted into the insertion hole 51 from above the adapter 48, to mount the pressure receiving metal fitting 57 on the mounting stepped section 48a, and the male screw section 52 of the adapter 48 is screwed into the female screw section 18 provided on the inner periphery of the opening section 17 of the body 2, to attach the adapter 48 on the upper portion of the body 2. In this state, the center of the primary-side opening section 13 in the body 2 and the center of the engagement bolt 59 match each other. Therefore, when the engagement bolt 59 is screwed, the engagement bolt 59 is screwed into the female screw section 34 provided on the inner peripheral surface 33 of the seat ring 4 press-fitted into and fixed to the press-fitting stepped section 26 in the body 2.

When the adapter 48 is turned in a direction in which it is removed from the body 2 (leftward) after it is confirmed that the head portion 59a of the engagement bolt 59 abuts on the pressure receiving metal fitting 57, the head portion 59a of the engagement bolt 59 is lifted upward via the pressure receiving metal fitting 57 as the adapter 48 rises. As a result of this, the seat ring 4 screwed into the engagement bolt 59 is pulled out of the press-fitting stepped section 26 in the body 2. In this case, the valve seat 3 is supported by the flange section 32 in the seat ring 4. Accordingly, the valve seat 3 is extracted while the flange section 32 locks the bottom portion 31 of the valve seat 3 at the same time that the seat ring 4 is pulled out. Therefore, the valve seat 3, together with the seat ring 4, can be taken out from inside the body 2 without being damaged.

Thus, in the method for replacing the valve seat according to the present invention, the valve seat can be easily exchanged without being damaged.

As described in detail above, the diaphragm valve according to the present invention can prevent the valve seat from being crushed and deformed even if subjected to a high-speed opening and closing operation in a high-temperature state and can stably ensure a large flow rate. The method for replacing the valve seat according to the present invention makes it possible to easily exchange the valve seat without damaging the valve seat, which is appropriate for a semiconductor manufacturing apparatus using an ALD process.

REFERENCE SIGNS LIST 1 diaphragm valve
2 body
3 valve seat
4 seat ring
5 diaphragm
6 actuator
13 primary-side opening section
20 outer wall section 21 stepped section
23 top portion of outer wall section
26 press-fitting stepped section
27 extension section
28 extension section
32 flange section
35 top portion of seat ring
42 press-fitting groove

The invention claimed is:

1. A diaphragm valve comprising:
    a body having a flow inlet and a flow outlet;
    a valve seat provided in the body;
    a diaphragm that is opened and closed by contacting and separating from the valve seat provided in the body;
    a primary-side opening section provided in the body so as to be in communication with the flow inlet;
    an outer wall section for valve seat mounting provided in the primary-side opening section;
    a stepped section provided in an inner periphery of the outer wall section;
    a seat ring press-fitted into and fixed to the stepped section;
    a flange section provided in the seat ring; and
    a press-fitting groove for valve seat mounting configured to define a space between the seat ring and the outer wall section and having the flange section as a bottom portion of the press-fitting groove,
    wherein the valve seat press-fitted into and fixed to the press-fitting groove has its upper portion slightly protruding from the press-fitting groove so as to form a first extension section and a second extension section, wherein an outer periphery of the first extension section is increased in the upper portion of the valve seat and covers a position in a vicinity of a top portion of the outer wall section, and an inner periphery of the second extension section is decreased in the upper portion of the valve seat and covers a position in a vicinity of a top portion of the seat ring, and
    wherein the top portion of the seat ring has a height which is smaller than a height of the outer wall section, and an inner diameter of the seat ring is larger than an inner diameter of the primary-side opening section.

2. The diaphragm valve according to claim 1, wherein an inner peripheral surface of the seat ring is provided with a female screw section.

3. The diaphragm valve according to claim 1, wherein the stepped section is further provided with a press-fitting stepped section, and the seat ring is press-fitted into the press-fitting stepped section to press-fit and fix the seat ring into and to the body.

4. The diaphragm valve according to claim 1, wherein an engagement section is provided in the outer wall section, and an outer periphery of a bottom portion of the valve seat has a large diameter section having an increased outer diameter such that, upon the valve seat being press-fitted into and fixed to the press-fitting groove, the large diameter section engages with the engagement section so that the valve seat that has been press-fitted and fixed does not come out of the press-fitting groove.

5. A method for replacing a valve seat in the diaphragm valve according to claim 1, the method comprising:
    removing the valve seat by screwing a jig provided with a male screw section into a female screw section provided on an inner peripheral surface of the seat ring to pull up the jig so as to extract the valve seat while locking a bottom portion of the valve seat by the flange section in the seat ring; and
    mounting a replacement valve seat by press-fitting a bottom portion of the replacement valve seat into the press-fitting groove with the bottom portion contacting an upper surface of the flange section so as to fix the bottom portion of the replacement valve seat to the press-fitting groove.

* * * * *